Aug. 6, 1968   J. O. CLAUDEL   3,395,477
INDICIA-MOUNTING FRAME FOR OVERHEAD PROJECTORS
Filed April 22, 1966   2 Sheets-Sheet 1
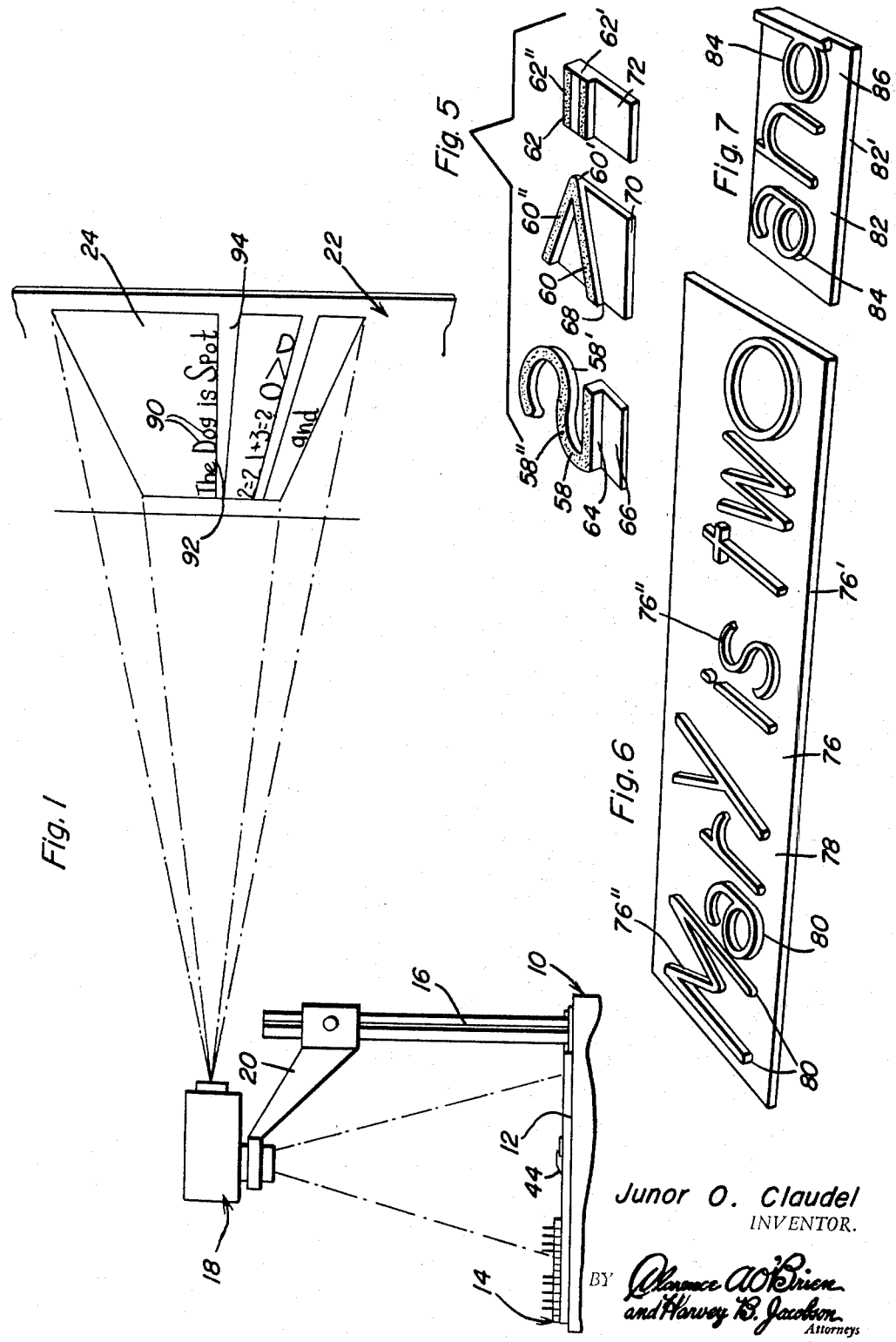
Junor O. Claudel
INVENTOR.

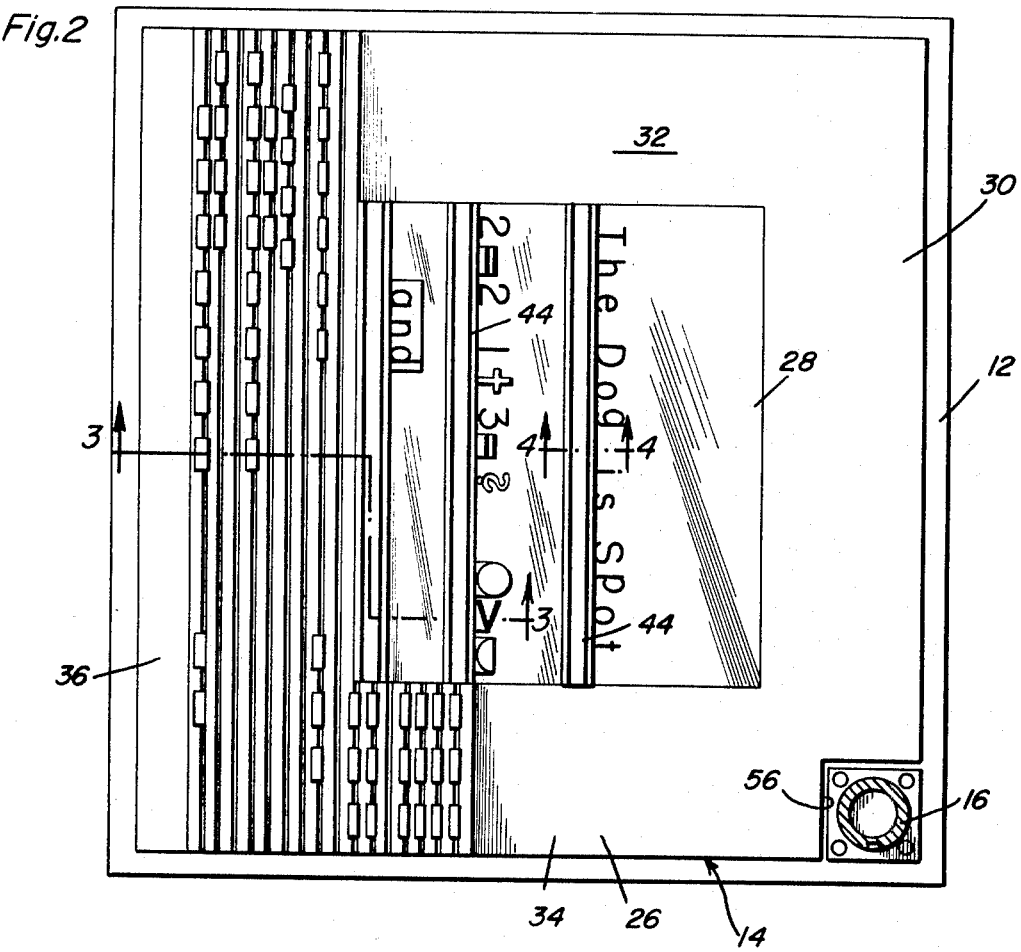
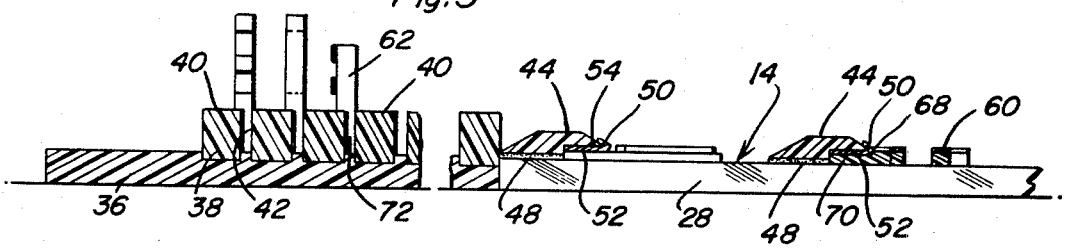
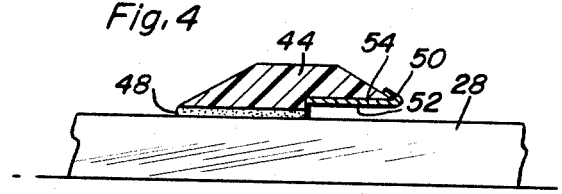

United States Patent Office 3,395,477
Patented Aug. 6, 1968

3,395,477
INDICIA-MOUNTING FRAME FOR
OVERHEAD PROJECTORS
Junor O. Claudel, Rte. 2, Box 212,
Baker, La. 70714
Filed Apr. 22, 1966, Ser. No. 544,576
9 Claims. (Cl. 40—158)

ABSTRACT OF THE DISCLOSURE

A transparent panel adapted for horizontal disposition on the illuminated panel of an overhead projector and having an elongated opaque belt defined thereon in combination with a plurality of indicia defining members comprising transparent panel-like members including opaque portions defining pre-selected indicia and adapted to be correctly positioned on the transparent panel section with the indicia defining opaque portions of the transparent panel-like members correctly positioned laterally of one longitudinal edge portion of the opaque belt even when some of the opaque portions are correctly positioned relative to the belt when spaced laterally therefrom and with the panel-like members being free of nontransparent portions thereof, except for the indicia forming opaque portions thereof, overlying any light transmitting transparent portions of the panel section disposed outwardly of the belt.

---

This invention relates to a novel and useful mounting panel and more specifically to a panel including a transparent section adapted to be disposed over and to rest upon the transparent table of an overhead projector or the like.

The mounting panel or frame of the instant invention is adapted to have opaque indicia-forming bodies positioned on the upper surface of the transparent section thereof so that light passing through the transparent table of the associated overhead projector and the transparent section of the frame will have portions thereof blocked by the opaque portions of the indicia-forming bodies thereby causing darkened areas to be formed on the associated projection screen duplicating the indicia defined by the indicia-forming bodies positioned on the transparent section of the frame.

The transparent section of the frame includes opaque belt-like strips extending thereacross and each of the strips includes positioning means adapted to coact with portions of the indicia-forming bodies or members to properly position the indicia-forming portions thereof with their base edges properly positioned with an edge portion of the associated opaque strip. By this construction, the image cast upon an associated projection screen by the overhead projector and the frame and indicia-forming members of the instant invention will have the indicia defined thereby properly aligned along one edge of the corresponding darkened strip defined by the opaque strips on the transparent section of the panel or frame.

The indicia-forming members of the instant invention may comprise cut-outs formed from opaque panel-like members and defining the desired indicia if the indicia include base edges which are adapted to be positioned along a reference line. However, if the indicia to be formed by the indicia-forming members is the type of indicia adapted to be spaced above a reference line, the indicia-forming members may then be constructed from transparent panel-like members having opaque portions thereon defining the desired indicia. In this manner, both types of indicia-forming members may have marginal edge portions of the panel-like members from which they are constructed engaged with the corresponding opaque strip extending across the transparent section of the frame to properly orientate the indicia-forming members relative to the strip with those indicia including base edges adapted to be disposed along a reference line having their base edges properly positioned along one edge of the opaque strip and those indicia adapted to be spaced from a reference line spaced outwardly from the corresponding edge of the opaque strip but operatively engaged therewith by means of the transparent portions thereof.

The main object of this invention is to provide an indicia-mounting frame for overhead projectors and the like and which may be utilized to define a darkened strip or belt across the image to be projected with suitable selected indicia correctly positioned relative to one edge portion of the darkened strip or belt.

Another object of this invention is to provide an apparatus in accordance with the preceding object and including means by which indicia-forming members may be readily supported therefrom for easy accessibility and in an orderly manner.

Still another object of this invention is to provide an apparatus which will be readily adaptable for use with substantially all makes of overhead projectors.

A final object of this invention to be specifically enumerated herein is to provide an apparatus in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of a conventional form of overhead projector with the indicia-mounting frame of the instant invention operatively associated therewith and in use to cast an image on an associated projection screen including horizontally aligned indicia properly orientated relative to horizontal darkened strips or belts extending across the image projected;

FIGURE 2 is an enlarged sectional view of the overhead projector illustrated in FIGURE 1 taken substantially upon a plane passing through the lower end portion of the support upright of the overhead projector;

FIGURE 3 is an enlarged fragmentary vertical sectional view taken substantially upon the plane indicated by the section line 3—3 of FIGURE 2;

FIGURE 4 is an enlarged fragmentary vertical sectional view taken substantially upon the plane indicated by the section line 4—4 of FIGURE 2;

FIGURE 5 is a perspective view of three indicia-forming members defining individual indicia;

FIGURE 6 is a perspective view of an indicia-forming member defining three words; and FIGURE 7 is a perspective view of an indicia-forming member defining a single word.

Referring now more specifically to the drawings, the numeral 10 generally designates an overhead projector of conventional design. The projector 10 includes a top panel or table 12 upon which the mounting frame of the instant invention generally designated by the reference numeral 14 is disposed. In addition, the projector 10 includes an upright post 16 extending upwardly from one corner thereof and upon whose upper end portion there is supported a lens assembly generally referred to by the reference numeral 18 by means of a support arm assembly vertically adjustable on the post 16.

A projection screen is generally designated by the reference numeral 22 and has projected thereon an image 24 to be hereinafter again referred to.

With reference now more specifically to FIGURES 2-4, it may be seen that the mounting frame 14 of the instant invention includes a generally panel-like body 26 including a transparent centrally disposed section 28. The boly 26 is disposed over the top panel or table 12 of the projector 10 with the transparent section 28 in registry with a corresponding transparent section (not shown) of the table 12. The body 26 includes opaque peripheral portions 30, 32, 34 and 36 disposed about and projecting outwardly of the section 28 and the peripheral portions 34 and 36 each has upwardly opening grooves 38 formed therein in which elongated parallel blocks 40 are secured defining slots or grooves 42 between each pair of adjacent blocks 40. Although only the peripheral portions 34 and 36 are illustrated including grooves 36 and blocks 40, it is to be noted that the peripheral portions 30 and 32 could also be provided with such grooves and blocks 38 and 40.

The transparent section 28 has a plurality of opaque strips 44 secured thereto in any convenient manner such as by adhesive 48 and each strip 44 includes an edge 50 having a rabbet 52 formed therein opening toward the transparent section 28 and the peripheral portion 30. Suitable fabric such as felt 54 may be secured in each rabbet 52 for a purpose to be hereinafter more fully set forth and as many strips 44 may be provided as are desired Further, it may be seen that the peripheral portions 30 and 34 have a notch 56 formed therein to receive the lower end of the post 16 and to assist in properly positioning the frame 14 on the table or top 12.

With attention now invited more specifically to FIGURE 5 of the drawings there may be seen a plurality of indicia-forming members 58, 60 and 62 defined by panel-like members 58', 60' and 62'. The panel-like member 58' includes an opaque cut-out portion 58" defining the numeral 2, the panel-like member 60' includes a cut-out opaque portion 60" defining an arithmetical symbol, and the panel-like member 62 includes opaque portions 62" defining an equal sign.

The cut-out portion 58" includes a base edge 64 and the panel-like member 58' includes a tongue portion 66 projecting outwardly of the base edge 64 adapted to be received in one of the grooves formed by the rabbet 52 on one of the strips 44. The tongue 66 is of course fully seatable in the groove and therefore the indicia-forming member 58 may be properly positioned with its base edge 64 extending along the edge 50 of the associated strip 40. Further, the indicia formed by the indicia-forming member 60 includes a base edge 68 from which a transparent tongue portion 70 of the panel-like member 60' projects. Therefore, the tongue portion 70 may also be seated in one of the grooves defined by an associated strip 44 to properly position the base edge 68 relative to the reference line defined by the edge 50 of that strip 44. Further, the indicia-forming member 62 includes a transparent tongue portion 72 which is also seatingly receivable in a corresponding groove defined by an associated strip 44 to properly position the opaque areas 62" in positions correctly spaced relative to the reference line defined by the edge 50 of the corresponding strip 44.

With attention now invited to FIGURE 6 there may be seen an indicia-forming member 76 including a transparent panel-like member 76' having opaque portions 76" thereon defining three words. The marginal edge portion 78 of the panel-like member 76' defines a tongue portion corresponding to the tongue portions 66, 70 and 72 and is therefore also seatingly receivable in one of the grooves defined by an associated strip 44 to properly position the opaque portions 76" with their base edges 80 along the edge 50 of the associated strip 44.

With attention now invited more specifically to FIGURE 7 of the drawings there may be seen yet another indicia-forming member 82 which is similar to the indicia-forming member 76 in that it comprises a transparent panel-like member 82' having opaque portions 84 formed thereon defining a single word. Further, the panel-like member 82' includes a marginal edge portion 86 defining a tongue portion corresponding to the tongue portion 78 and which is also receivable in one of the grooves defined by the rabbets 52.

From FIGURE 1 of the drawings it may be seen that by utilizing indicia-forming members such as the members 58, 60, 62, 76 and 82 the image 24 may have the indicia 90 defined thereby properly positioned relative to a reference line 92 defined by the edge of the corresponding darkened strip or belt 94 extending across the image 24 and defined by the corresponding edge 50 even though the indicia 90 do not include edge portions adapted to be disposed immediately adjacent a reference line. Further, the upper portion of the transparent section 28 is free of strips 44 and may be written on with green pencil or the like whereby written opaque or at least translucent indicia may be formed on the section 28 and thus reproduced in the image 24. Finally, the felt 54 is provided to enable the various indicia-forming members to be frictionally held in position on the section 28.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An indicia-mounting frame for overhead projectors and the like, said frame including a transparent panel section having at least one elongated opaque belt defined thereon including one longitudinal edge portion forming a reference line along which indicia forming members are adapted to be placed, a plurality of indicia defining members comprising panel-like members including opaque portions defining pre-selected indicia adapted to be correctly positioned relative to and along said reference line for reading said indicia along said line, panel-like members being disposed on one side of said panel section, the portions of said frame defining said belt and said panel-like members including coacting abutment means positioning said panel-like members on said section relative to said reference line so as to correctly position said indicia relative to said reference line, said panel-like members being free of nontransparent portions thereof, except for said indicia forming opaque portions, overlying transparent portions of said panel section disposed outwardly of said belt, whereby the image of light rays passing through said transparent panel section and transparent panel-like members and cast upon a suitable screen will include a darkened zone along one edge of which a plurality of darkened indicia forming areas are positioned, all other portions of the image cast being light.

2. The combination of claim 1 wherein said coacting means also includes means adapted to coact with said members to also establish proper rotated positioning of the latter relative to said belt about axes disposed generally normal to said one side face.

3. The combination of claim 1 wherein said coacting means defines a groove extending along said belt and opening outwardly of said reference line said panel-like members including tongue portions projecting outwardly of said members and seated in said groove.

4. The combination of claim 3 wherein said tongue portions comprise transparent extensions of said panel-like members.

5. The combination of claim 1 wherein said opaque belt is defined by an opaque strip secured to and extending across said one side face of said transparent section.

6. The combination of claim 1 wherein said transparent panel section is of a predetermined plan size and shape adapted to conform to the size and shape of the transparent table of an overhead projector and includes at least one opaque marginal portion extending outwardly of the corresponding marginal edge of said section and including along said strip and opening outwardly of said one indicia forming members therefrom in stored orderly fashion.

7. The combination of claim 1 wherein said opaque belt is defined by an opaque strip secured to and extending across said one side face of said transparent section, said coacting means including a groove formed in and extending along said strip and opening outwardly of said one longitudinal edge portion of said strip.

8. The combination of claim 7 wherein said groove comprises a rabbet formed in the side of said one longitudinal edge portion adjacent said transparent section and coacting with the latter to form a groove including opposite side walls and a bottom wall.

9. The combination of claim 1 wherein the indicia defined by some of said opaque portions are properly positioned when fully spaced from a reference line.

References Cited
UNITED STATES PATENTS
| | | | |
|---|---|---|---|
| 2,346,096 | 4/1944 | Whitaker | 40—140 X |
| 2,804,699 | 9/1957 | Robinson | 35—73 |

FOREIGN PATENTS
| | | |
|---|---|---|
| 662,665 | 7/1938 | Germany. |

EUGENE R. CAPOZIO, *Primary Examiner.*

W. J. CONTRERAS, *Assistant Examiner.*